United States Patent [19]

Gees

[11] Patent Number: 4,869,556
[45] Date of Patent: Sep. 26, 1989

[54] AXLE SHAFT ASSEMBLY FOR A MOTOR VEHICLE

[75] Inventor: Theodor Gees, Florsheim, Fed. Rep. of Germany

[73] Assignee: General Motors Corporation, Detroit, Mich.

[21] Appl. No.: 208,695

[22] Filed: Jun. 20, 1988

[30] Foreign Application Priority Data

Aug. 6, 1987 [DE] Fed. Rep. of Germany ....... 3726135

[51] Int. Cl.$^4$ .............................................. B60B 35/12
[52] U.S. Cl. ................................ 301/124 R; 301/126; 180/259
[58] Field of Search ............... 301/124 R, 124 H, 125, 301/126, 131; 464/904, 906; 403/57, 58, 74; 180/259

[56] References Cited

U.S. PATENT DOCUMENTS

| 1,937,821 | 12/1933 | Jarrett | 180/259 X |
| 3,367,139 | 2/1968 | Ristau | 464/906 X |
| 3,688,521 | 9/1972 | Smith et al. | 464/906 X |
| 3,822,570 | 7/1974 | Fisher | 464/906 X |
| 3,899,898 | 8/1975 | Takahashi et al. | 464/906 X |
| 4,027,927 | 6/1977 | Turner | 464/906 X |
| 4,579,476 | 4/1986 | Post | 403/322 |

FOREIGN PATENT DOCUMENTS 3337797  3/1985  Fed. Rep. of Germany.
3408857  7/1985  Fed. Rep. of Germany.
3430067  4/1986  Fed. Rep. of Germany.

OTHER PUBLICATIONS

German article, K. H. Schütz: Gleichlauf-Kugelgelenke für den Kraftfahrzeugantrieb, dated 1971.

Primary Examiner—Russell D. Stormer
Attorney, Agent, or Firm—F. J. Fodale

[57] ABSTRACT

A constant velocity universal joint of an axle shaft assembly has a drive hub which receives a splined shaft in an extension which projects from a drive bell. The splined shaft is held in the drive hub in such a position that it can be pushed further into the drive hub after removal of a locking ring. This makes it possible to shorten the axle shaft assembly for the purpose of mounting by an additional amount in comparison to prior-art axle shaft assemblies.

4 Claims, 1 Drawing Sheet

U.S. Patent
Sep. 26, 1989
4,869,556
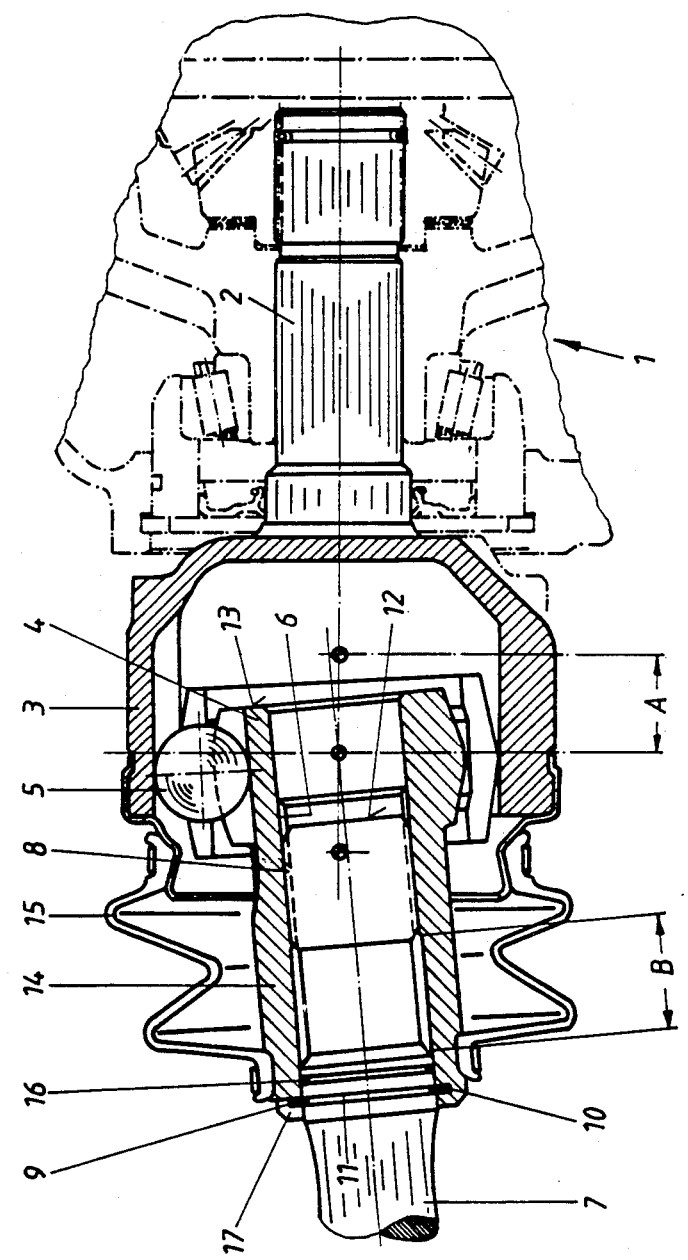

AXLE SHAFT ASSEMBLY FOR A MOTOR VEHICLE

BACKGROUND OF THE INVENTION

The present invention pertains to an axle shaft assembly for a motor vehicle which has a splined shaft which is pushed into and locked in a drive hub which pivots and moves axially in a drive bell of a constant velocity universal joint. Axle shaft assemblies of this type are generally known for connecting the transmission to the driven wheels of motor vehicles.

It is desirable that such axle shafts can be mounted and removed without having to loosen or remove other adjacent components. Since the drive hub moves axially in the drive bell in the prior-art axle shafts, this axial displacement, which is needed for the mobility of the axle shaft, can be utilized for mounting the axle shaft. However, the maximum possible axial displacement of the drive hub in the drive bell is not sufficient in the prior-art axle shafts for mounting without detaching other components. To achieve a sufficient shortening of the prior-art axle shafts for mounting, it has been necessary to design the universal joints at each end of the axle shaft as axially displaceable universal joints.

SUMMARY OF THE INVENTION

The object of the present invention is to provide an axle shaft assembly of the above described type which can be shortened for mounting in one universal joint enough so that the axle shaft assembly can be mounted without removal of adjacent components.

The object is accomplished according to the present invention in that the splined shaft is mounted in the drive hub with its bell-side end face displaced a distance from the end face of the drive hub so that further displacement of the splined shaft into the hub is possible when the splined shaft lock is removed.

This design according to the present invention leads, in addition to the known displacement of the drive hub within the drive bell, to a second displacement due to the splined shaft being displaceable within the drive hub. The sum of the two displacements can be set such that a sufficient shortening of the axle shaft assembly is possible within a single universal joint. Mounting of the axle shaft assembly is thus possible without detaching adjacent components even if the axle shaft assembly has only one axially displaceable universal joint.

The splined shaft can be locked within the drive hub in a simple manner by providing the drive hub with an extension which projects out of the drive bell and by locking the splined shaft in its mounted position by means of a locking snap ring which engages in a circular groove of the inner generated surface of the drive hub and the generated surface of the splined shaft, and which has its actuating ends disposed into a milled-out recess which is accessible from the outside of the universal joint.

According to another advantageous embodiment of the present invention, the universal joint is sealed on the one hand, by a bellows type boot, one end of which seals off the drive bell and the other end seals off the extension, and on the other hand, by a seal ring between the splined shaft and the inner generated surface of the drive hub. Such a sealing arrangement can be manufactured at low cost and permits sufficient pivoting of the splined shaft relative to the bell.

It is also possible to remove the splined shaft without removing the bellows type boot when the locking ring is located near the outer end face of the drive hub outside of the bellows type boot according to another advantageous embodiment of the present invention.

BRIEF DESCRIPTION OF THE DRAWING

The present invention may have numerous advantageous embodiments. To illustrate its basic principle more clearly, one of these embodiments will be described below.

The drawing which consists of a single FIGURE, shows a longitudinal section through the transmission-side end of an axle shaft according to the present invention.

DESCRIPTION OF THE PREFERRED EMBODIMENT

The drawing shows a detail of a transmission 1 and an axle shaft assembly comprising a drive shaft 2 forming a drive bell 3 on the outside of the transmission. A drive hub 4 which is disposed inside this bell 3 is pivotable and axially displaceable within the drive bell 3. This drive hub 4 has an extension 14 which projects out of the bell 3. A ball 5 is also seen which is held on the hub 4 and guides it inside the bell 3. The hub 4 has internal splines 6 which mesh with a splined shaft 7 having external splines 8, which is pushed into the hub 4. The splined shaft 7 is held in the hub 4 in the position shown by a locking snap ring 9 which reaches into a circular groove 10 of the internal generated surface of the hub 4 and a groove 11 of the splined shaft 7.

It is an important feature of the present invention that in its mounted position, the bell-side end face 12 of the splined shaft 7 is at a spaced location from the bell-side end face 13 of the hub 4. This makes it possible to push the splined shaft 7 into the hub 4 by an amount marked by B after removing the locking ring 9. It is thus possible to shorten the axle shaft assembly during the mounting by this displacement B in addition to the displacement of the hub 4 within the bell 3, which is marked by A.

To seal the universal joint, a bellows type boot 15 is attached to the bell 3, the other end of which is attached to the extension 14 of the drive hub 4. In addition, a packing ring 16 is provided between the splined shaft 7 and the extension 14. To permit removal of the locking ring 9 without removal of the bellows type boot 15, the locking ring 9 is arranged near the end of the extension 14 facing away from the bell 3. The actuating ends of the locking snap-ring 9 are disposed in a milled-out recess 17 of the extension 14, so that the locking snap ring 9 is accessible from the outside for widening and removal from the groove 11 of the splined shaft 7.

The embodiments of the invention in which an exclusive property or privilege is claimed are defined as follows:

1. An axle shaft assembly for a motor vehicle which has a splined shaft which is inserted into and locked in a drive hub which pivots and moves axially in a drive bell of a constant velocity universal joint, characterized in that the splined shaft has an end face inside the drive bell which is displaced a substantial distance from an end face of the drive hub inside the drive bell so that the splined shaft does not extend fully into the drive hub so that substantial further displacement of the splined shaft into the drive hub is possible when a device locking the splined shaft in the drive hub is released to shorten the axle shaft assembly.

2. An axle shaft assembly according to claim 1, characterized in that the drive hub has an extension which projects out of the drive bell and the splined shaft is locked in the drive hub by a locking ring which engages in a circumferential groove in the inner cylindrical surface of the drive hub and a groove in the cylindrical surface of the splined shaft and which has actuating ends which are disposed in a recess in the drive hub, which is accessible from the outside.

3. An axle shaft assembly according to claim 2, characterized in that the universal joint is sealed by a bellows type boot which is mounted sealingly with one end on the drive bell and with its other end on the extension, and by a seal ring between the splined shaft and the inner cylindrical surface of the drive hub.

4. An axle shaft assembly according to claim 3, characterized in that the locking ring is disposed near an outer end face of the drive hub outside of the bellows type boot.

* * * * *